United States Patent
Saruwatari et al.

(12)
(10) Patent No.: US 6,622,699 B2
(45) Date of Patent: Sep. 23, 2003

(54) CONTROL APPARATUS AND CONTROL METHOD OF NEGATIVE PRESSURE ACTUATOR

(75) Inventors: Masayuki Saruwatari, Atsugi (JP); Junichi Furuya, Atsugi (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 10/191,285

(22) Filed: Jul. 10, 2002

(65) Prior Publication Data

US 2003/0010308 A1 Jan. 16, 2003

(30) Foreign Application Priority Data

Jul. 13, 2001 (JP) ......................................... 2001-213476

(51) Int. Cl.$^7$ ................................................. F02D 9/08
(52) U.S. Cl. ...................................... 123/401; 123/403
(58) Field of Search ................................. 123/319, 401, 123/402, 403

(56) References Cited

U.S. PATENT DOCUMENTS 4,738,233 A * 4/1988 Hitomi et al. ............ 123/190.2
6,338,330 B1 * 1/2002 Jessberger et al. .......... 123/389

FOREIGN PATENT DOCUMENTS

JP           07-189708           7/1995

* cited by examiner

Primary Examiner—Bibhu Mohanty
(74) Attorney, Agent, or Firm—Foley & Lardner

(57) ABSTRACT

In a negative pressure actuator which is provided with a negative pressure tank storing an intake negative pressure of an engine, and operated by a negative pressure stored in said negative pressure tank as a power source, an operating possible time of the negative pressure actuator is calculated based on an intake negative pressure, the operation of the negative pressure actuator is permitted when it is within the operating possible time, while the operation of the negative pressure actuator is prohibited when it is over the operating possible time.

16 Claims, 4 Drawing Sheets

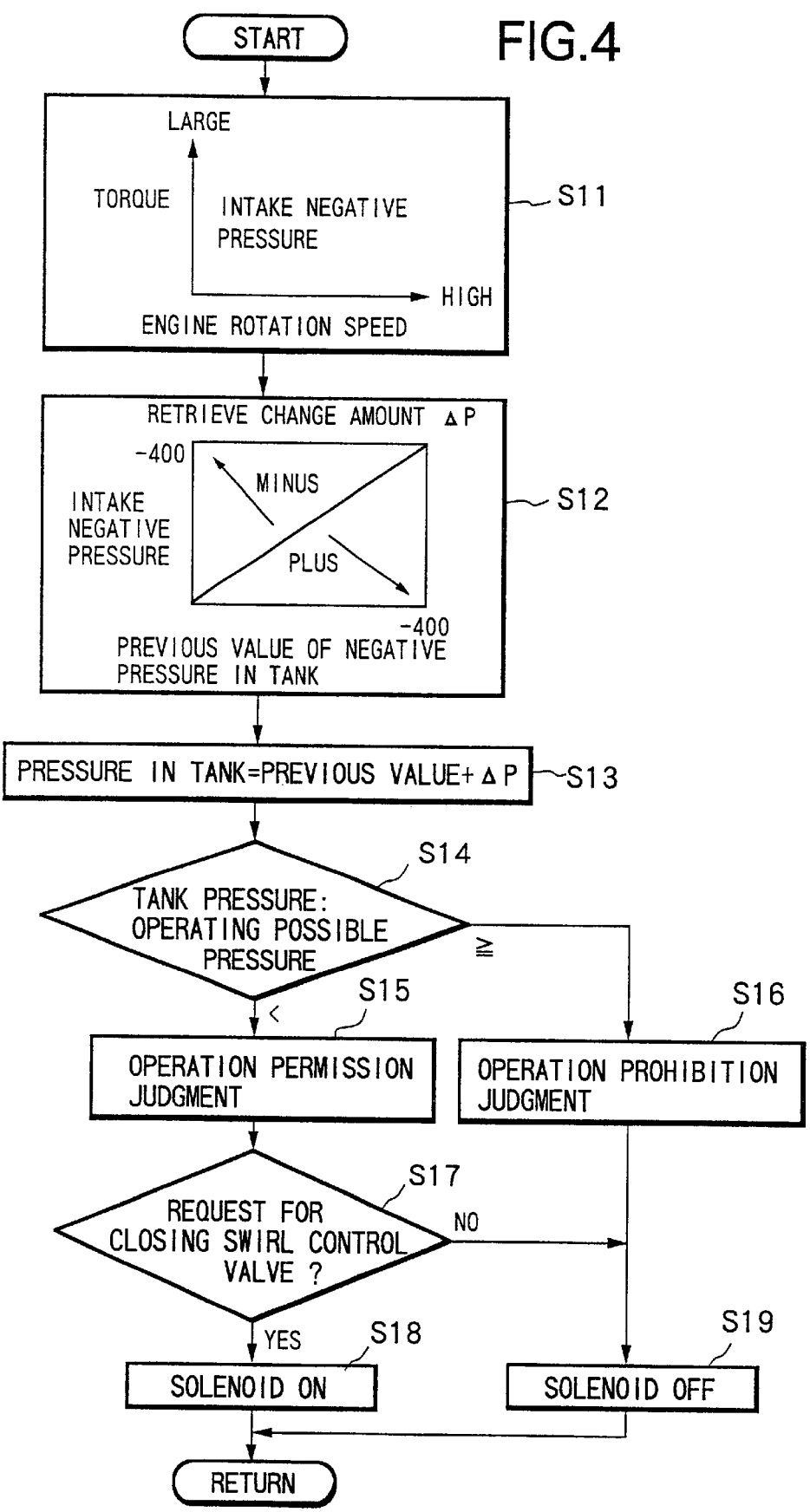

CONTROL APPARATUS AND CONTROL METHOD OF NEGATIVE PRESSURE ACTUATOR

FIELD OF THE INVENTION

The present invention relates to a control apparatus and a control method a negative pressure actuator used, for example, for opening and closing an intake control valve in an engine, which is operated by an intake negative pressure stored in a negative pressure tank as a power source.

RELATED ART OF THE INVENTION

Heretofore, there has been known a negative actuator comprising a negative pressure tank storing an intake negative pressure in an engine, a diaphragm type actuator which is operated by a negative pressure stored in the negative pressure tank as a power source, a valve which is driven to open and close by the actuator, and a solenoid valve which switching controls between supply of the negative pressure and supply of an atmospheric pressure to the actuator, wherein the opening and closing of the valve is controlled by controlling the power supply to the solenoid valve (refer to Japanese Unexamined Patent Publication No. 7-189708).

Since the negative pressure in the negative pressure tank is released when the engine intake negative pressure is reduced, the negative pressure actuator is permitted to operate only when the engine intake negative pressure exceeds an operating possible negative pressure of the negative pressure actuator.

However, even if the intake negative pressure exceeds the operating possible negative pressure to approach the atmospheric pressure, the negative pressure in the negative pressure tank is not released at once and a time delay exists for the negative pressure in the negative pressure tank to become smaller than the operating possible negative pressure.

Therefore, in such an arrangement as mentioned above, the operation of the negative pressure actuator is prohibited although the negative pressure of sufficient amount is stored in the negative pressure tank.

SUMMARY OF THE INVENTION

The present invention has an object to provide a control apparatus and a control method of a negative pressure actuator, capable of using a negative pressure in a negative pressure tank to the most possible extent to operate the negative pressure actuator.

In order to achieve the above object, the present invention is constructed to calculate an operating possible time of a negative pressure actuator based on an engine operating condition, and to permit the operation of the negative pressure actuator if it is within the operating possible time, while prohibiting the operation of the negative pressure actuator if the operating possible time is exceeded.

The present invention is also constructed to calculate a negative pressure in a negative pressure tank based on an engine operating condition, and to permit the operation of the negative pressure tank if the calculated negative pressure is greater than a threshold value, while prohibiting the operation of the negative pressure actuator if the calculated negative pressure is less than the threshold value.

Other objects and features of this invention will be understood from the following description with reference to the accompanying drawings.

BRIEF EXPLANATION OF THE DRAWINGS

FIG. 4 is a flowchart showing a second embodiment of the negative pressure actuator control.

DETAILED DESCRIPTION OF PREFERRED EMBODIMENT

Figure 1:
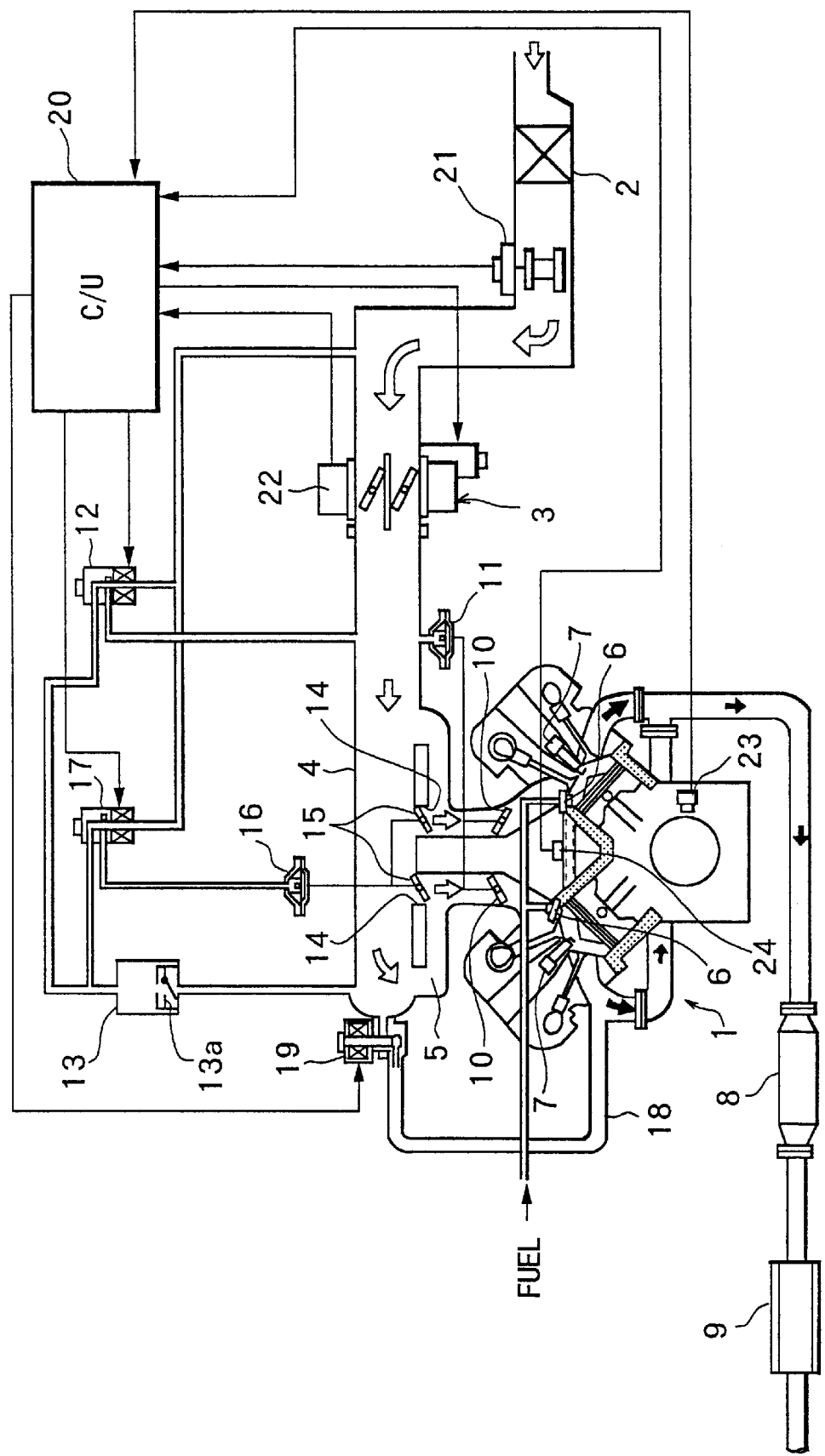
FIG. 1 is a diagram showing a system structure of an engine in an embodiment of the present invention.

FIG. 1 is a diagram showing a system structure of an engine in an embodiment.

As shown in FIG. 1, air is sucked into a combustion chamber of each cylinder in a V-type engine 1 mounted on a vehicle, through an air cleaner 2, an electronic controlled throttle chamber 3, an intake collector 4, and an intake manifold 5.

An electromagnetic fuel injection valve 6 that directly injects fuel is disposed in the combustion chamber of each cylinder.

The air-fuel mixture formed in the combustion chamber is ignited to burn by an ignition plug 7.

Note, engine 1 is not limited to the direct injection type gasoline engine as mentioned above but may be an engine that injects fuel into an intake port.

An exhaust gas from engine 1 is discharged into an atmosphere via a catalyst 8 and a muffler 9.

A swirl control valve 10 as an intake control valve is disposed in a branch portion of intake manifold 5.

Swirl control valve 10 is driven to open and close by a diaphragm type negative pressure actuator 11.

A pressure chamber partitioned by the diaphragm of negative pressure actuator 11 is supplied with selectively either an atmospheric pressure introduced by a solenoid 12 from a point between downstream of air cleaner 2 and upstream of throttle chamber 3, or a negative pressure from a negative pressure tank 13.

When solenoid 12 is OFF and the atmospheric pressure is supplied to negative pressure actuator 11, swirl control valve 10 is fully opened.

On the other hand, when solenoid 12 is turned ON and the negative pressure is supplied to negative pressure actuator 11, swirl control valve 10 is closed.

Negative pressure tank 13 is communicated with intake collector 4 via a check valve 13a.

Thus, when a pressure in intake collector 4 is low, check valve 13a is opened and the intake negative pressure is stored in negative pressure tank 13.

A variable intake control valve 15 is provided as an intake control valve that opens and closes a bypass passage 14, in order to switch an effective length of the branch portion of intake manifold 5.

Variable intake control valve 15 is driven to open and close by a diaphragm type negative pressure actuator 16.

A pressure chamber partitioned by the diaphragm of negative pressure actuator 16 is supplied with selectively either the atmospheric pressure introduced by solenoid 17 from a point between downstream of air cleaner 2 and upstream of throttle chamber 3, or the negative pressure from negative pressure tank 13.

When solenoid 17 is OFF and the atmospheric pressure is supplied to negative pressure actuator 16, variable intake control valve 15 is fully closed.

On the other hand, when solenoid 17 is turned ON and the negative pressure is supplied to negative pressure actuator 16, variable intake control valve 15 is opened.

In addition, an exhaust gas recirculation passage 18 is provided to recirculate a part of the exhaust gas to intake collector 4.

In exhaust gas recirculation passage 18 is disposed an exhaust gas recirculation control valve 19 that controls an exhaust gas recirculation amount.

Throttle chamber 3, fuel injection valve 6, swirl control solenoid 12, solenoid 17, and exhaust gas recirculation control valve 19 are controlled by control signals from a control unit 20 incorporating therein a microcomputer.

Control unit 20 receives an intake air amount signal from an air flow meter 21, a throttle sensor signal from a throttle opening degree sensor 22, a position signal from a crank angle sensor 23, and a water temperature signal from a water temperature sensor 24.

In control unit 20, an engine rotation speed Ne is calculated based on the position signal.

Figure 2:
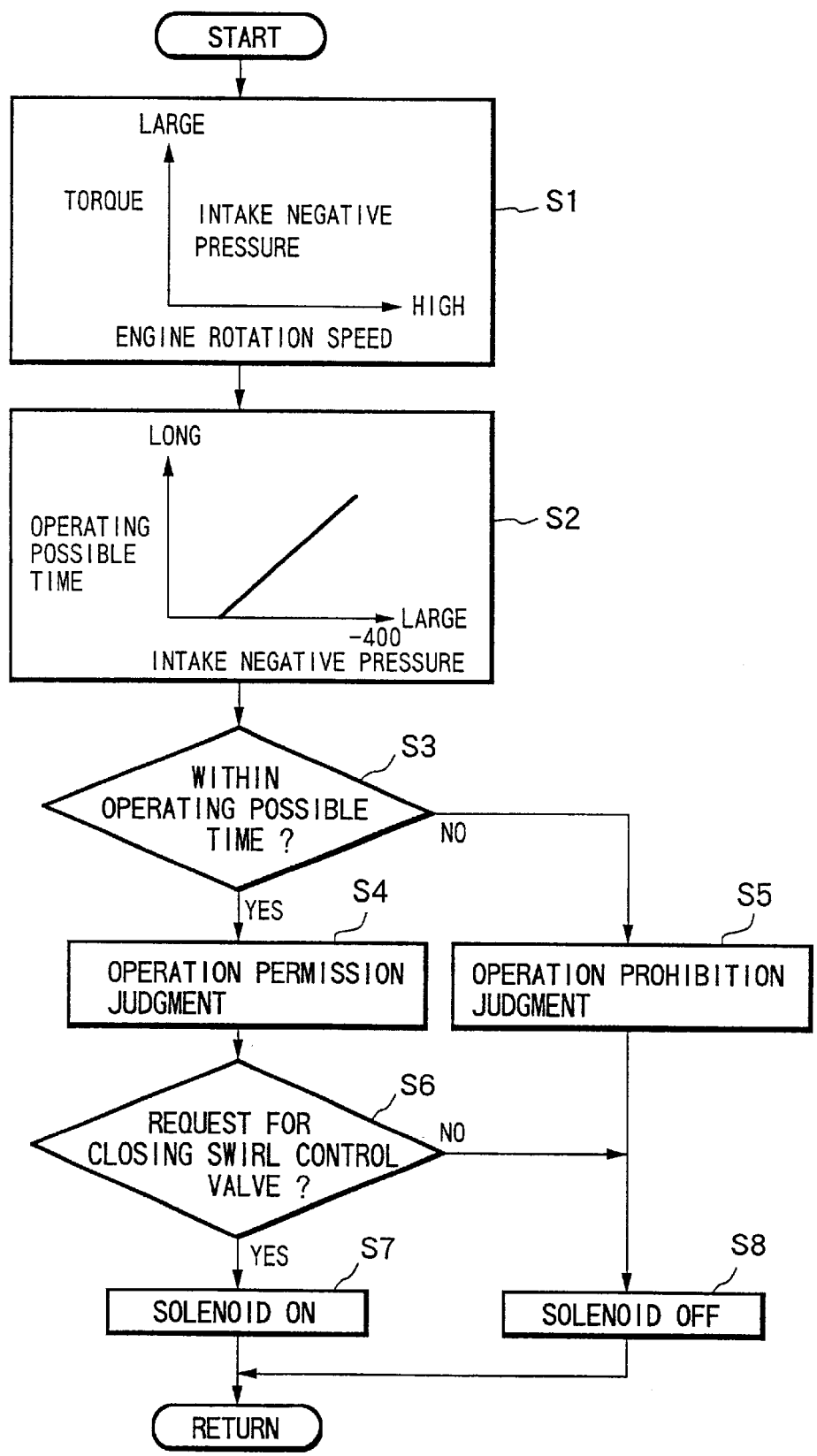
FIG. 2 is a flowchart showing a first embodiment of a negative pressure actuator control.

A control of power supply to solenoid 12 will be now described according to a flowchart in FIG. 2.

In the flowchart in FIG. 2, at Step S1, an intake negative pressure is calculated based on an engine torque calculated based on the intake air amount and the engine rotation speed Ne, and the engine rotation speed Ne.

When an intake negative pressure sensor is provided, at Step S1, a detection value of the intake negative pressure sensor is read out.

At Step S2, an operating possible time corresponding to the intake negative pressure determined at Step S1 is retrieved from a look-up table storing in advance a correlation between the intake negative pressure and the operating possible time of negative pressure actuator 11.

The operating possible time is set longer as the intake negative pressure is larger, and when the intake negative pressure is smaller than the negative pressure requiring for operating negative pressure actuator 11, the operating possible time is set at 0.

When it is assumed that the intake negative pressure is equal to the negative pressure in the negative pressure tank, even if the intake negative pressure becomes an atmospheric pressure afterwards, the operating possible time is a minimum time within which is held a condition that the negative pressure in negative pressure tank 13 is larger than the negative pressure requiring for operating negative pressure actuator 11.

In this embodiment, as described later, the operating possible time is set based on the engine operating condition, and if the operating possible time is set as longer at the next routine than the operating possible time set previously, this longer operating possible time takes precedence over the previous operating possible time, an operation of negative pressure actuator 11 is permitted within the entire operating possible time, and the operation permission takes precedence.

At Step S3, it is judged whether or not it is within the operating possible time set at Step S2.

When it is judged at Step S3 that it is within the operating possible time, the control proceeds to Step S4, where the operation permission of negative pressure actuator 11 is judged.

On the other hand, when it is judged at Step S3 that it is over the operating possible time, the control proceeds to Step S5, where the operation of negative pressure actuator 11 is prohibited.

The operation permission of negative pressure actuator 11 leads a state that the negative pressure required for driving to close swirl control valve 10 can be supplied to negative pressure actuator 11 by switching solenoid 12 ON.

On the other hand, the operation prohibition leads a state that the negative pressure required for driving to close swirl control valve 10 cannot be supplied to negative pressure actuator 11 even if solenoid 12 is switched ON.

At Step S4, when the operation permission of the actuator 11 is judged, the control proceeds to Step S6.

At Step S6, the determination is made whether or not there is a demand for closing swirl control valve 10.

When there is the demand for closing swirl control valve 10, the control proceeds to Step S7.

At Step S7, the negative pressure in negative pressure tank 13 is supplied to negative pressure actuator 11 by switching solenoid 12 ON.

On the contrary, when it is determined at Step S6 that there is no demand for closing swirl control valve 10, and when the operation prohibition of negative pressure actuator 11 is judged at Step S5, the control proceeds to Step S8, At Step S8, solenoid 12 is switched OFF, so that the atmospheric pressure is supplied to negative pressure actuator 11.

Figure 3:
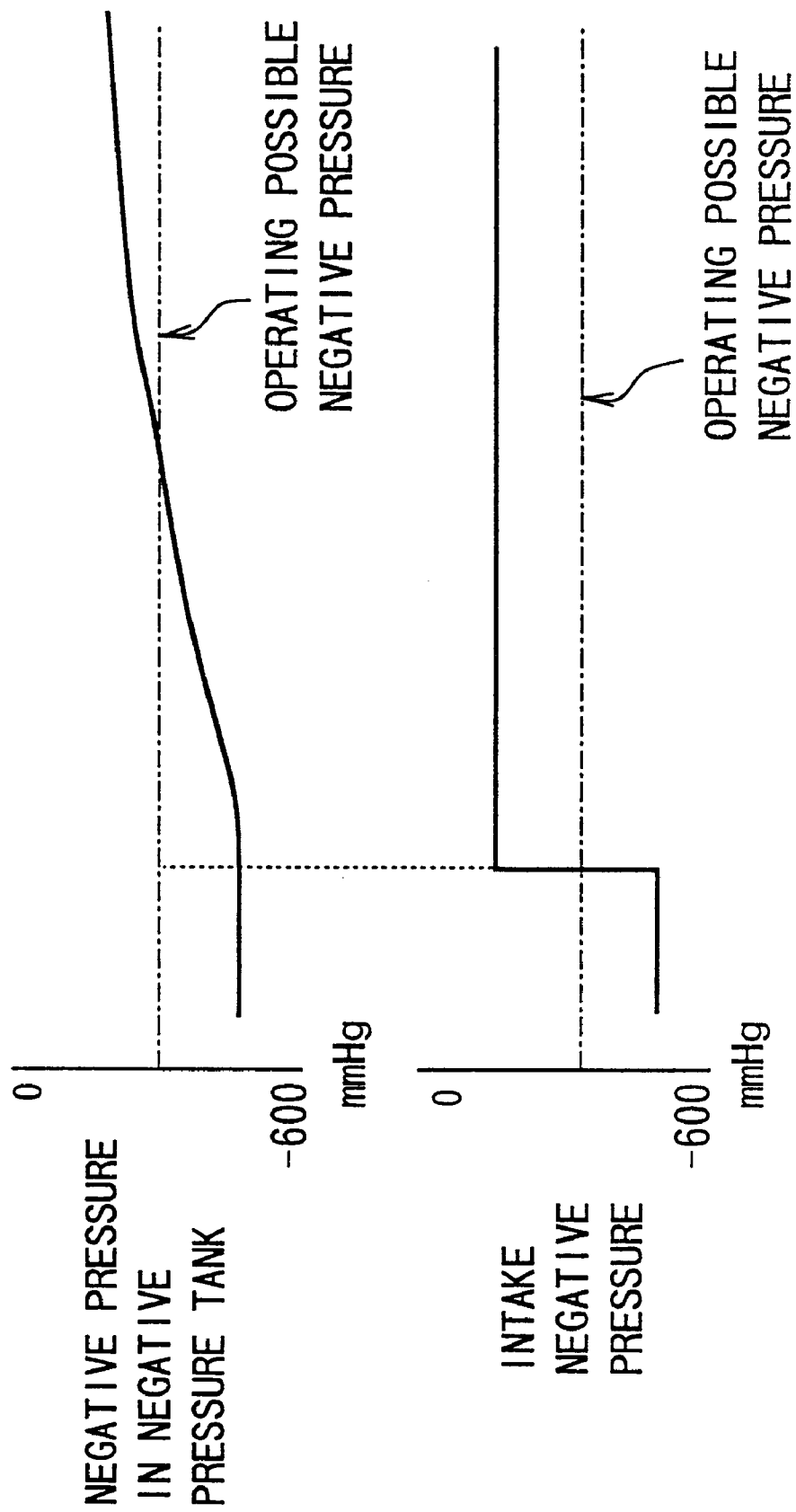
FIG. 3 is a time chart showing a correlation between an intake negative pressure and a negative pressure in a negative pressure tank.

For example, as shown in FIG. 3, when the intake negative pressure is suddenly changed from a condition larger than the operating possible negative pressure of negative pressure actuator 11 to a condition close to the atmospheric pressure, although the negative pressure of negative pressure tank 13 is confined therein, it will be gradually released.

When a certain time has elapsed (for example, 5 minutes–10 minutes), the negative pressure of negative pressure tank 13 becomes smaller than the negative pressure required for operation.

Thus, if the operation of negative pressure actuator 11 is prohibited at a point the intake negative pressure becomes smaller than the operating possible negative pressure of actuator 11, the control to operate actuator 11 is not performed in a condition that the negative pressure in negative pressure tank 13 is smaller than the operating possible negative pressure of actuator 11.

However, as described above, when the operation of negative pressure actuator 11 is prohibited based on the intake negative pressure, it is impossible to operate negative pressure actuator 11 by using the negative pressure remaining in negative pressure tank 13.

Therefore, the time required for the negative pressure of negative pressure tank 13 to be released to become smaller than the operating possible negative pressure of negative pressure actuator 11 is calculated as the operating possible time. If it is within this time, the operation of negative pressure actuator 11 is permitted.

Accordingly, negative pressure actuator 11 can be operated during a period of from when the negative pressure of negative pressure tank 13 begins to be gradually released to when it becomes smaller than the negative pressure required for operation.

Since negative pressure actuator 11 drives to close swirl control valve 10, an engine operation range and frequency can be expanded in a condition that swirl control valve 10 is being closed.

A flowchart in FIG. 4 shows a second embodiment for controlling solenoid 12.

At Step S11, similarly to Step S1 of the first embodiment, the intake negative pressure at that time is estimated based on the engine torque and the engine rotation speed.

Alternately, the intake negative pressure may be detected by the intake negative pressure sensor.

At Step S12, a change amount ΔP (kPa/sec) of a pressure in negative pressure tank 13 is obtained from a previous value of the negative pressure in negative pressure tank 13 and the intake negative pressure estimated at Step S11.

More specifically, when the intake negative pressure is larger than the negative pressure in negative pressure tank 13 (when an intake pressure is lower than the pressure in negative pressure tank 13), a minus value is set as the change amount ΔP, and an absolute value of the change amount ΔP is set to become larger as the pressure difference is larger.

When the intake negative pressure is smaller than the negative pressure in negative pressure tank 13 (when the intake pressure is higher than the pressure in negative pressure tank 13), a plus value is set as the change amount ΔP, and an absolute value of the change amount ΔP is set to become larger as the pressure difference is larger.

Moreover, when the intake negative pressure substantially equals the negative pressure in negative pressure tank 13, the change amount ΔP is set to 0.

The above characteristic satisfies the fact that when the intake negative pressure is larger than the negative pressure in negative pressure tank 13, the pressure in negative pressure tank 13 is lowered to the same level of the intake negative pressure (i.e., is increased as negative pressure), on the other hand, when the intake negative pressure becomes smaller than the negative pressure in negative pressure tank 13, although the negative pressure is confined in negative pressure tank 13, the negative pressure is released as faster as the pressure difference is larger.

Even if the pressure difference is the same as an absolute value, since a release speed of the negative pressure is significantly slow relative to an increase speed of the negative pressure, the plus change amount ΔP of the decrease side of negative pressure is set to a value of significantly smaller than the minus change amount ΔP.

An initial value of the pressure in negative pressure tank 13 is set as the atmospheric pressure (relative pressure=0).

At Step S13, the change amount ΔP is added to the previous value of the pressure in negative pressure tank 13, and this result is set as a pressure in negative pressure tank 13 at this time.

At Step S14, it is judged whether or not the negative pressure required for operating negative pressure actuator 11 is stored in negative pressure tank 13 by comparing the pressure in negative pressure tank 13 obtained at Step S13 with the operating possible negative pressure of negative pressure actuator 11.

When the pressure in negative pressure tank 13 is larger than the operating possible negative pressure (i.e., the pressure in negative pressure tank 13 is smaller than the operating possible pressure), the control proceeds to Step S15. At Step S15, the operation permission of negative pressure actuator 11 is judged.

On the contrary, when the pressure in negative pressure tank 13 is equal to or less than the operating possible negative pressure (i.e., the pressure in negative pressure tank 13 is equal to or larger than the operating possible pressure), the control proceeds to Step S16, where the operation prohibition of negative pressure actuator 11 is judged.

When the operation permission of negative pressure actuator 11 is judged at Step S15, the control proceeds to Step S17, where the determination is made whether or not there is a demand for closing swirl control valve 10.

When there is the demand for closing swirl control valve 10, the control proceeds to Step S18, where the negative pressure in negative pressure tank 13 is supplied to negative pressure actuator 11 by switching solenoid 12 ON.

On the other hand, when there is no demand for closing swirl control valve 10 or when the operation prohibition of negative pressure actuator 11 is judged at Step S16, the control proceeds to Step S19.

At Step S19, solenoid 12 is switched OFF, so that the atmospheric pressure is introduced to negative pressure actuator 11.

According to the above construction, a negative pressure change of when the negative pressure in negative pressure tank 13 is gradually released is estimated, and, as long as the operating possible negative pressure is held in negative pressure tank 13, the operation of negative pressure actuator 11 can be permitted.

Accordingly, even if the intake negative pressure is smaller than the operating possible negative pressure of negative pressure actuator 11, the demand for closing swirl control valve 10 can be satisfied, and thereby the region and frequency of the engine operation (lean-burn combustion) at a condition where the swirl control valve 10 is closed can be expanded.

In the above embodiments, the operation control of actuator 11 for swirl control valve 10 has been described, but the operation control of negative pressure actuator 16 for variable intake control valve 15 can be performed in the same manner.

The entire contents of Japanese Patent Application No. 2001-213476, filed Jul. 13, 2001, a priority of which is claimed, are incorporated herein by reference.

While only selected embodiments have been chosen to illustrate the present invention, it will be apparent to those skilled in the art from this disclosure that various change and modification can be made herein without departing from the scope of the invention as defined in the appended claims.

Furthermore, the foregoing description of the embodiments according to the present invention are provided for illustration only, and not for the purpose of limiting the invention as defined by the appended claims and their equivalents.

What is claimed is:

1. A control apparatus of a negative pressure actuator which is provided with a negative pressure tank storing an intake negative pressure of an engine, and operated by a negative pressure stored in said negative pressure tank as a power source, comprising:

a sensor that detects an engine operating condition; and a control unit that receives a detection signal from said sensor, and calculates a control signal for said negative pressure actuator based on said detection signal to output said control signal, wherein said control unit calculates an operating possible time of said negative pressure actuator based on the operating condition detected by said sensor; and permits the operation of said negative pressure actuator when it is within said operating possible time, while prohibiting the operation of said negative pressure actuator when it is over said operating possible time.

2. A control apparatus of a negative pressure actuator according to claim 1, wherein said sensor detects the engine intake negative pressure, and said control unit calculates the operating possible time of said negative pressure actuator based on said detected engine intake negative pressure.

3. A control apparatus of a negative pressure actuator according to claim 1, wherein said sensor detects an engine torque and an engine rotation speed; and said control unit calculates the engine intake negative pressure based on the engine torque and the engine rotation speed, and calculates the operating possible time of said negative pressure actuator based on said calculated engine intake negative pressure.

4. A control apparatus of a negative pressure actuator according to claim 1, wherein said negative pressure actuator opens and closes an intake control valve disposed in an intake passage of the engine.

5. A control apparatus of a negative pressure actuator which is provided with a negative pressure tank storing an intake negative pressure of an engine, and operated by a negative pressure stored in said negative pressure tank as a power source, comprising:

operating condition detecting means for detecting an engine operating condition;

operating possible time calculating means for calculating an operating possible time of said negative pressure actuator based on the engine operating condition detected by said operating condition detecting means; and operation control means for permitting the operation of said negative pressure actuator when it is within said operating possible time calculated by said operating possible time calculating means, while prohibiting the operation of said negative pressure actuator when it is over said operating possible time.

6. A control apparatus of a negative pressure actuator which is provided with a negative pressure tank storing an intake negative pressure of an engine, and operated by a negative pressure stored in said negative pressure tank as a power source, comprising:

a sensor that detects an engine operating condition; and a control unit that receives a detection signal from said sensor, and calculates a control signal for said negative pressure actuator based on said detection signal to output said control signal, wherein said control unit calculates a negative pressure in said negative pressure tank based on the operating condition detected by said sensor; and permits the operation of said negative pressure actuator when said calculated negative pressure in said negative pressure tank is larger than a threshold value, while prohibiting the operation of said negative pressure actuator when said calculated negative pressure in said negative pressure tank is less than a threshold value.

7. A control apparatus of a negative pressure actuator according to claim 6, wherein said sensor detects an engine torque and an engine rotation speed; and said control unit calculates the engine intake negative pressure based on the engine torque and the engine rotation speed, calculates a negative pressure change amount from a previous negative pressure based on said calculated engine intake negative pressure and the previous negative pressure in said negative pressure tank, and calculates a present negative pressure in said negative pressure tank based on said negative pressure change amount and the previous negative pressure in said negative pressure tank.

8. A control apparatus of a negative pressure actuator according to claim 6, wherein said negative pressure actuator opens and closes an intake control valve disposed in an intake passage of the engine.

9. A control apparatus of a negative pressure actuator which is provided with a negative pressure tank storing an intake negative pressure of an engine, and operated by a negative pressure stored in said negative pressure tank as a power source, comprising:

operating condition detecting means for detecting an engine operating condition;

negative pressure calculating means for calculating a negative pressure in said negative pressure tank based on the engine operating condition detected by said operating condition detecting means; and operation control means for permitting the operation of said negative pressure actuator when said calculated negative pressure in said negative pressure tank is larger than a threshold value, while prohibiting the operation of said negative pressure actuator when said calculated negative pressure in said negative pressure tank is less than the threshold value.

10. A control method of a negative pressure actuator which is provided with a negative pressure tank storing an intake negative pressure of an engine, and operated by a negative pressure stored in said negative pressure tank as a power source, said method comprising the steps of:

detecting an engine operating condition;

calculating an operating possible time of said negative pressure actuator based on said detected operating condition;

permitting the operation of said negative pressure actuator when it is within said operating possible time; and prohibiting the operation of said negative pressure actuator when it is over said operating possible time.

11. A control method of a negative pressure actuator according to claim 10, wherein said step of detecting an engine operating condition detects the engine intake negative pressure, and said step of calculating an operating possible time calculates the operating possible time of said negative pressure actuator based on said detected engine intake negative pressure.

12. A control method of a negative pressure actuator according to claim 10, wherein said step of detecting an operating condition detects an engine torque and an engine rotation speed; and said step of calculating an operating possible time comprises the steps of:

calculating the engine intake negative pressure based on the engine torque and the engine rotation speed; and calculating the operating possible time of said negative pressure actuator based on said calculated engine intake negative pressure.

13. A control method of a negative pressure actuator according to claim 10,
   wherein said negative pressure actuator opens and closes an intake control valve disposed in an intake passage of the engine.

14. A control method of a negative pressure actuator which is provided with a negative pressure tank storing an intake negative pressure of an engine, and operated by a negative pressure stored in said negative pressure tank as a power source, said method comprising the steps of:
   detecting an engine operating condition;
   calculating a negative pressure in said negative pressure tank based on said detected operating condition;
   permitting the operation of said negative pressure actuator when said calculated negative pressure in said negative pressure tank is larger than a threshold value; and
   prohibiting the operation of said negative pressure actuator when said calculated negative pressure in said negative pressure tank is less than the threshold value.

15. A control method of a negative pressure actuator according to claim 14,
   wherein said step of detecting an operating condition detects an engine torque and an engine rotation speed; and
   said step of calculating a negative pressure in said negative pressure tank comprises the steps of:
      calculating the engine intake negative pressure based on the engine torque and the engine rotation speed;
      calculating a negative pressure change amount from a previous negative pressure based on said calculated engine intake negative pressure and the previous negative pressure in said negative pressure tank; and
      calculating a present negative pressure in said negative pressure tank based on said negative pressure change amount and the previous negative pressure in said negative pressure tank.

16. A control method of a negative pressure actuator according to claim 14,
   wherein said negative pressure actuator opens and closes an intake control valve disposed in an intake passage of the engine.

* * * * *